June 5, 1962
G. DARNELL
3,037,245
MOLDING APPARATUS
Filed Dec. 8, 1958
2 Sheets-Sheet 1
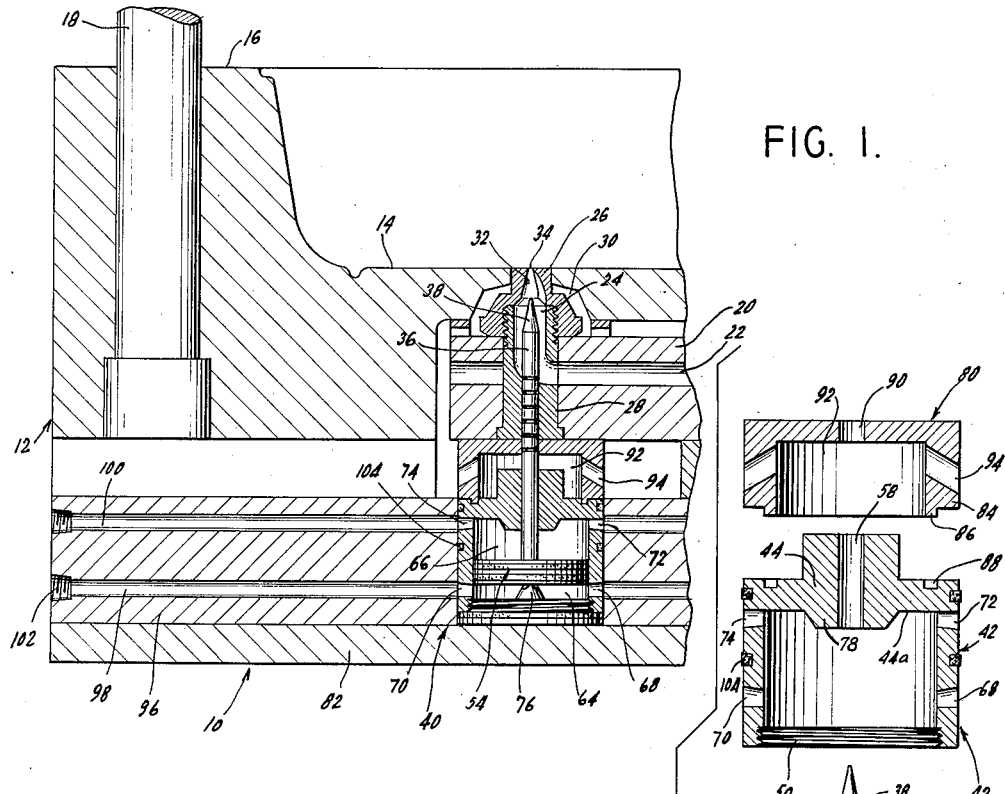
FIG. 1.
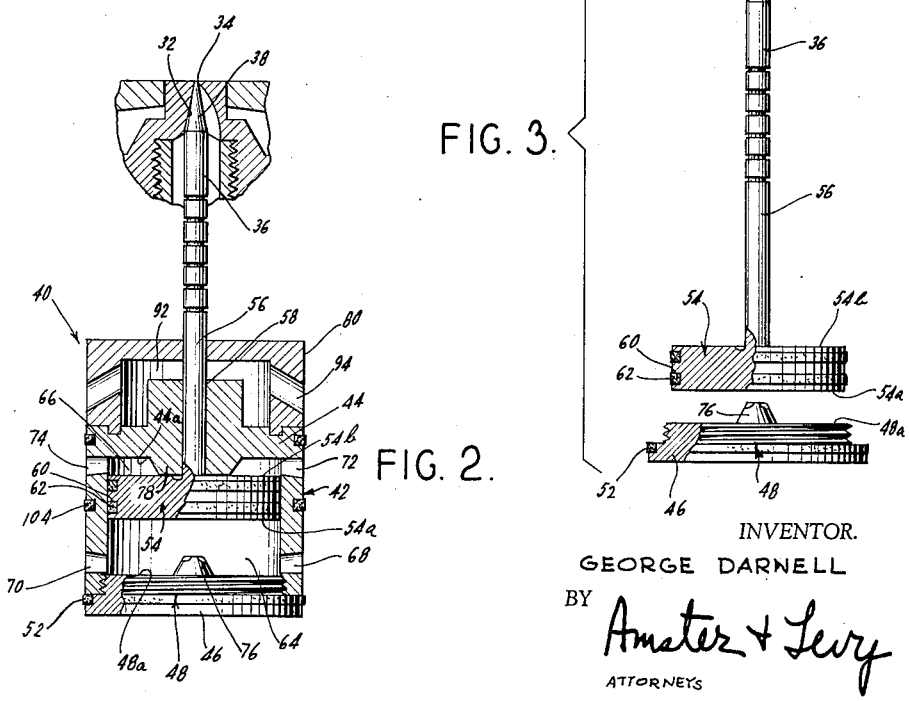
FIG. 2.
FIG. 3.
INVENTOR.
GEORGE DARNELL
BY
*Amater & Levy*
ATTORNEYS

INVENTOR.
GEORGE DARNELL

United States Patent Office 3,037,245
Patented June 5, 1962

1

3,037,245
MOLDING APPARATUS
George Darnell, Scarsdale, N.Y.
Filed Dec. 8, 1958, Ser. No. 778,697
5 Claims. (Cl. 18—30)

The present invention relates generally to molding apparatus of the injection type for use in the manufacture of molded articles of plastic material, and in particular to an improved actuating system for operating a plunger useful as a valving or stripping means in an injection molding machine.

Conventional molding apparatus usually comprises separate sprue, cavity and core sections held in adjacent relationship between stationary and movable platens of the apparatus. The cavity and core sections are partible at the end of the molding cycle. Provision is made for introducing the synthetic material, usually a thermosetting or thermoplastic resin into the cavities of the mold, by a group of divergent passages which emanate from a common pressure chamber outlet. In certain types of molding applications, the passages leading to the molding cavities cause the material contained therein to form integral extensions on the articles in the molding cavities which are known as sprue runners. These runners must be broken or cut off or otherwise removed from the article and from the mold at the conclusion of the molding cycle. To this end, provision must be made for the separation of the runner from the molded article and the removal of the runner from the mold. One approach to avoiding the formation of such sprue runners is to equip the sprue passageways for each mold cavity with appropriate means which are disposed and operated to arrest the flow of the plastic material into the molding cavity such as to preclude the formation on the molded articles of the sprue runners or other inegral extensions which require breakoff from the molded article before the same can be removed from the mold. Usually this means is in the form of a valving arrangement arranged to block off a resin-admitting gate orifice or valve seat disposed at the cavity-communicating end of the associated sprue passage or bore to close off the orifice or to engage the valve seat.

Broadly, it is an object of the present invention to provide improved means in an injection molding machine suitable to achieve a stripping or valving function. Specifically, it is within the contemplation of the present invention to provide an improved air-operated actuating system which may be contained within the mold in axial alignment with the sprue passage or bore communicating with the mold cavity for operating a plunger, serving to either strip the sprue runner at the end of the molding cycle or to periodically close off the sprue passage during the molding cycle.

In accordance with an illustrative embodiment demonstrating features and advantages of the present invention an injection molding machine is provided with a mold part having a molding surface with means providing a bore in communication with the molding surface and a plunger in the bore which is movably retracted in advanced positions relative the molding surface. Means are provided for moving the plunger between the retracted and advanced positions which include a cylinder mounted on the mold part in axial alignment with the bore and a piston mounted in the cylinder for reciprocatory movement. The piston is operatively connected to the plunger and conveniently may be an integral extension thereof. Appropriate means are provided for admitting air under pressure into the cylinder for reciprocating the piston to thereby displace the same between the retracted and the advanced positions. The plunger may either be formed to serve as stripping or knock-out means for the sprue

2 runner or as a closure member for the gating or valving of the bore which serves as an inlet passage for the heated plastic material which is introduced into the molding machine under ram-imparted pressures in a mobile condition.

The above brief description, as well as further objects, features and advantages of the present invention will be more fully appreciated by reference to the following detailed description of several illustrative embodiments in accordance with the present invention, were taken in conjunction with the accompanying drawing, wherein:

FIG. 1 is a sectional view, with parts broken away, showing an actuating mechanism for a valving assembly demonstrating features of the present invention;

FIG. 2 is a fragmentary sectional view, similar to FIG. 1 but on an enlarged scale and with parts partially shown in elevation and sections for the purposes of clarity and illustration, with the actuating mechanism in the advanced position corresponding to closing of the valve seat or material-admitting gate orifice of the mold;

FIG. 3 is an exploded sectional view of the component parts of the actuating mechanism and valving assembly illustrated in FIGS. 1 and 2;

Figures 4, 5, 6:
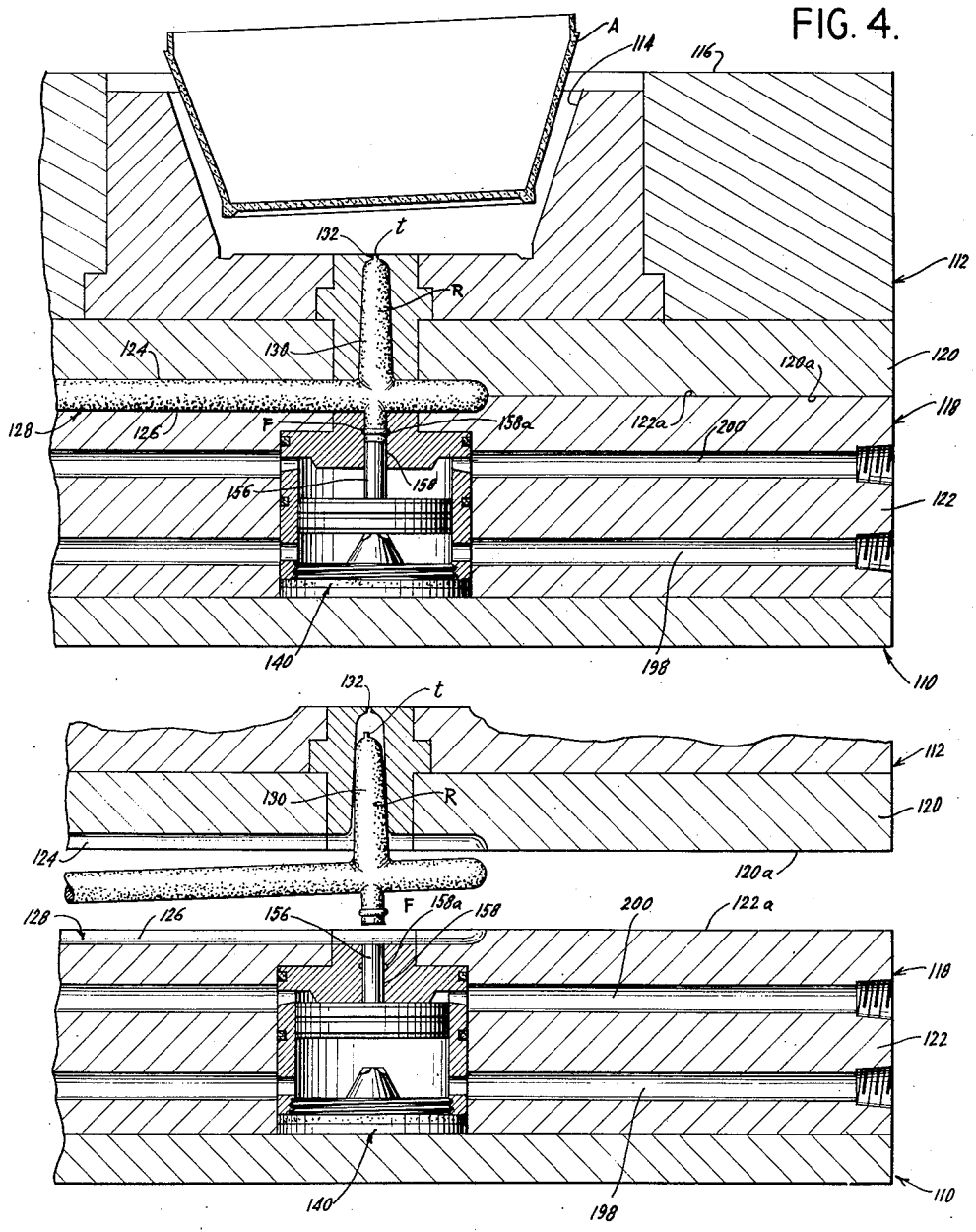
FIG. 4 is a sectional view of a mold of the type wherein the molded articles are formed on a sprue runner incorporating actuating mechanisms for a knock-out or stripper assembly demonstrating further features of the present invention, the molded article being shown removed from the mold for the purposes of illustration.
FIG. 5 is a sectional view similar to FIG. 4 showing the mold after parting and stripping of the sprue runner by the stripping assembly which is illustrated in the advanced position; and, FIG. 6 is a somewhat schematic and diagrammatic showing of the arrangement for selectively introducing air under pressure to the actuating mechanisms illustrated in FIGS. 1–5 inclusive.

Referring specifically now to the drawings there is shown in FIGS. 1–3 inclusive an improved actuating mechanism and valve assembly in accordance with the present invention for use in the mold 10 of an injection molding machine. In the interest of simplicity and clarity in illustration all that is shown in the drawings is a part of the mold cavity section or block 12 of the mold 10 which is formed with molding surfaces 14 defining a cavity therein. It will be appreciated of course that the cavity section 12 coacts with a core section (not shown) which is brought into contact with the cavity section 12 along the parting surface 16 by one or more aligning pins 18. The core section is formed with an appropriate male part which is received within the cavity and coacts with the molding surfaces 14 to form the mold cavity of the required configuration.

Mounted within the mold section 12 is a hot runner housing formed with a hot runner channel 22 through which a supply of mobile heated plastic material is forced under ram-developed pressures to a bore or passageway 24 which extends at right angles to the hot runner channel 22 and has its leading end in communication with the cavity 14 through an adjacent mold surface thereof. Although only one bore or passage 24 is shown leading off of the channel 22, a number of such bores may be provided for different regions of the same cavity or for successive cavities of the mold. In this illustrative embodiment the bore or passage 24 is formed in a seat-forming member 26 which has its leading end in coextensive relation with and forming a substantial continuation of the adjacent molding surface 14 of the cavity and has threaded into the trailing end thereof a plunger bushing 28 which traverses the hot runner housing 20. The seat-forming member 26 is appropriately isolated from the mold-block 12 by a substantially annular air-insulating space 30 and is formed axially thereof with a substantially conical valve seat 32 which opens into the adjacent molding surface through a gating orifice or opening 34. Mounted within the bore or passage 24 in axial alignment therewith and with conical valve seat 32 is a valve plunger 36 formed at its leading end with a conical valve seating projection 38, the plunger 36 being axially reciprocated by means hereinafter to be described from the retracted position illustrated in FIG. 1 through a prescribed linear stroke to the seating position illustrated in FIG. 2. Since the mold and the valve gating mechanism are substantially conventional and are merely illustrative of typical environments for the application of the present invention, further description of this structure is dispensed with in the interest of simplicity and clarity.

In accordance with the present invention, a valve-actuating system or mechanism 40 is provided for moving the plunger between the retracted position illustrated in FIG. 1 and the advanced or seating position illustrated in FIG. 2. The valve-actuating mechanism, shown in detail in FIG. 3, comprises a cylinder 42 closed at its forward end by an end wall 44 and having a removable end cap 46 at its other end. As seen best in FIG. 2, the removable end cap 46 is formed with an inwardly projecting, externally threaded plug 48 which is received within a complementary threaded opening 50 formed on the inner periphery of the cylinder 42, with an appropriate sealing gasket 52 being seated between the adjacent end face of the cylinder and the end cap 46 to provide an air-tight seal therebetween.

Mounted within the cylinder for reciprocatory movement is a double-acting piston 54 which has formed integrally therewith a piston rod 56 which in this embodiment is seen to be integral with and a continuation of the valve plunger 36. The piston rod 56 extends through a piston-rod opening 58 formed axially of the end wall or bushing 44 of the cylinder 42. The peripheral bearing area of the piston 42 is formed with a number of circumferentially extending grooves 60 which receive piston rings 62 such that isolated variable volume chambers 64, 66 are formed at the opposite sides of the piston 54. The chamber 64 is defined by the adjacent face 54a of the piston 54, the confronting inner face 48a of the plug 48 of the end cap 46 and the intermediate bounding portions of the cylinder proper. The chamber 66 is defined by the opposite face 54b of the piston 54, the adjacent confronting faces 44a of the end wall or bushing 44, and the intermediate bounding portions of the cylinder proper.

A set of diametrically opposed air-inlet ports 68, 70 are provided in the cylinder 42 in communication with the chamber 64 contiguous to the plug face 48a for introducing air under pressure to the chamber 64 and for relieving pressure in the chamber 64. A similar set of diametrically opposed air-inlet ports 72, 74 are provided in communication with the chamber 66 contiguous to the face 44a of the end wall or bushing 44.

As seen in FIG. 1, the travel of the piston 54 toward the end cap 46 is limited by a stop of frusto-conical configuration which is relieved away toward its innermost end face. As is seen in FIG. 2 a stop 78 is formed integral with the end wall 44 extending inwardly from the inner surface 44a thereof for limiting the travel of the piston toward the end wall 44.

In order to assemble the cylinder 42 within the mold section 12, there is provided an adapter collar or sleeve 80 which interfits with and forms an extension or continuation of the cylinder 42 such that the assembly of the adapter collar 80 and the cylinder 42 may be mounted intermediate the hot-runner housing 20 and the back-up plate 82 of the mold 10, as shown in FIG. 1. The adapter collar 80 is formed with a depending skirt 84. Projecting from its lowermost end is an annular dog 86 which is received within an accommodating slot 88 formed in the uppermost surface of the end wall 48 of the cylinder 42 such that the interfitting dog 86 and slot 88 make for the ready assembly interengagement and alignment of the collar 80 and cylinder 42. The collar 80 is formed with a centrally disposed plunger bore 90 which is in alignment with the plunger bore 58 such that the piston 56 and plunger 36 may be extended through such aligned bores in the assembly illustrated in FIGS. 1 and 2. The collar 80 and the end wall 44 of the cylinder 42 coact to define a trap or chamber 92 having a run-out opening 94 such that residual leakage of the hot plastic material past the plunger 36 and through the bore in the bushing 28 may flow into the trap 92 and through the run-out opening 94 during molding. Any such accumulations may be removed periodically from within the mold, as is generally understood.

Means are provided for introducing air under pressure to one side or the other of the piston 58 for reciprocating the piston rod 56 and the integral valve plunger 36. This means is in the form of an air-inlet plate 96 formed with elongated air passageways 98, 100 which communicate respectively with the sets of air inlet ports 68, 70 and the air inlet ports 72, 74. Provision is made for connecting the air inlet passageways 98, 100 to an appropriate source of air under pressure via a valving arrangement, for example that illustrated in FIG. 6. Conveniently the entry ends of the passageways may be threaded, as designated by the reference numeral 102, to receive complementary threaded fittings on the ends of air hoses. Although the air inlet plate is broken away at the right side of FIG. 1, it will be appreciated that the respective pairs of inlet openings 68, 70 and 72, 74 permit the air passages 98, 100 to be connected in series with further actuating mechanisms similar to the described arrangement which are associated with further valve plungers within the mold. In order to effectively isolate the passageways 98, 100 and the respective communicating ports, appropriate circumferential sealing means, for example in the form of the O-rings 104 are seated in grooves on the outer periphery of the cylinder 42 and engage the adjacent complementary bore surfaces of the air-inlet plate 96 to form air-tight seals therebetween.

A typical sequence of operations will now be described in order to facilitate a more thorough understanding of the present invention.

Upon connection of the air-inlet passageways 98, 100 to an appropriate valve (which may conveniently take the form of a solenoid control valve connected in the timing and electrical arrangement of the molding machine) at the prescribed time in the molding cycle when it is necessary to close off the hot runner channel 22, air is introduced into the passageway 98 via the port 70 into the lowermost chamber 64 of the double-acting piston and cylinder. The piston 54 is driven through the forward stroke to the limit position established by stop 78, as shown in FIG. 2, which brings the conical extension 38 of the valve plunger 36 into seating engagement with the complementary valve seat 32 thereby blocking off the orifice 34, with the foremost end of the valve extension serving as a continuation, or part of the molding surface 14. At some time later in the molding cycle, the timing and electrical arrangement is effective to connect the passageway 98 to the atmosphere and to introduce air under pressure into the passageway 100 which drives the piston 54 through the return stroke, moving the plunger 36 to the retracted position illustrated in FIG. 1 wherein the orifice 34 is clear to introduce the molding material into the cavity.

Referring now specifically to FIGS. 4 and 5 there is shown another application for an improved plunger actuating mechanism constructed in accordance with the present invention. In this illustrative embodiment, the molded article A is formed on a sprue runner R and the illustrative mold 110 is seen to include a cavity section or mold block 112 formed with a cavity 114 which normally coacts with an appropriate core section which abuts against the parting surface 116. Positioned behind the cavity section 112 is a sprue or runner section 118 which includes confronting passage forming parts 120, 122 which are partible (see FIG. 5) and are formed on their confronting surfaces 120a and 122a with channels 122, 124 which define the sprue runner passageway 128 (see FIG. 4). The sprue runner passageway 128 communicates with the cavity 114 through a bore or passage 130 which extends at right angles to the sprue passageway and opens into the cavity 114 at an orifice 132 of reduced diameter such that a break-off tip t is provided between the sprue runner and the molded article A, as is generally understood. In injection molding machines of this type, the parts 120, 122 of the sprue section 118 part, as seen in FIG. 5, such that the sprue runner R breaks off from the article A at the tip t, with the sprue runner R being carried away from the mold block 112 in the sprue part 122. Thereupon it is necessary to remove the sprue runner R from its supported position on the sprue part 122, the stripped or removed position of the sprue runner R being shown in FIG. 5.

In accordance with this aspect of the present invention a plunger actuating mechanism 140 which is substantially identical in construction to the mechanism illustrated in FIG. 2 except for the removal of the spacer collar or sleeve 82 is mounted on the sprue part 122, with the sprue part in this embodiment serving to provide the elongated air inlet passageways 198, 200 to the mechanism 140. Since the unit 140 is substantially identical to the mechanism previously described, detailed description will be dispensed with except insofar as the same differs.

In this embodiment, the piston bore 158 extends at right angles to and communicates with the groove 126 of the runner passageway 128 and receives the piston 156 which serves as a knock-out pin or stripping plunger for the runner R. The plunger bore is provided with an angular groove 158a such that an annular locking flange F is formed on the sprue runner R during the molding operation (see FIG. 4) which tends to carry the sprue runner R away from the cavity block 112 incident to parting of the sprue parts or sections 120, 122. The depth of the annular groove 158 is such that there is a reasonable assurance that the sprue runner R will be carried back with the sprue section 122 incident to parting, but is such as to enable the runner R to be stripped from the sprue section 122 when the plunger or stripping pin 156 is advanced through its forward or operative stroke.

In a typical sequence of operations, when the molding cycle is completed the sprue section 122 moves away from the sprue section 120 carrying with it the runner R. Thereupon air is introduced via the air-inlet passageway 198 to the lower side of the piston to drive the piston through the forward stroke whereupon the plunger 156 strips the runner R from the sprue section 122, as illustrated in FIG. 5. It will of course be appreciated that several stripping arrangements may be provided in series along the length of the mold such that the runner may be forcibly removed or ejected from the sprue section at the end of the molding cycle.

In FIG. 6 there is shown a typical valving arrangement, generally designated by the reference character V, which may be electrically controlled and is effective to selectively port the air into one or the other of the air inlet passageways associated with the actuating mechanism, for example the passageways 98, 100 in the embodiment illustrated in FIGS. 1–3, or the passageways 198, 200 in the embodiment illustrated in FIGS. 4 and 5. It will be apparent to those skilled in the art that this valving arrangement may be coordinated into the overall timing and electrical arrangement which determines the molding cycle to achieve the valving and/or stripping functions at the appropriate time in the molding cycle.

From the foregoing it will be appreciated that there is provided in accordance with the present invention an improved plunger actuating mechanism which may be bodily incorporated into a mold at a prescribed location to achieve a stripping and/or valving function. The mechanisms employed are essentially simple and may be manufactured at a relatively low cost and are readily installed directly in the mold at the required locations to achieve their intended function.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. In an injection molding machine, a mold including a cavity block having a molding surface, means providing a bore in communication with said molding surface, a plunger mounted in said bore for reciprocating movement toward and away from said molding surface, a backup plate spaced from said cavity block, and means within said mold intermediate said cavity block and said backup plate for effecting reciprocatory movement of said plunger, said means including a cylinder mounted between said cavity block and said backup plate in axial alignment with said bore, a double-acting piston mounted in said cylinder for reciprocation, a piston rod in axial alignment with said plunger and operatively connecting said piston to said plunger, and inlet means for introducing air under pressure to one side or the other of said piston, said inlet means being in communication with inlet ports formed in said cylinder at opposite sides of said piston.

2. In an injection molding machine, a mold including a cavity block having a molding surface, means providing a bore in communication with said molding surface, a plunger mounted on said bore for reciprocating movement toward and away from said molding surface, a backup plate spaced from said cavity block, and means within said mold intermediate said cavity block and said backup plate for effecting reciprocatory movement of said plunger, said means including a cylinder mounted between said cavity block and said backup plate in axial alignment with said bore, a double-acting piston mounted in said cylinder for reciprocation, a piston rod in axial alignment with said plunger and integrally connecting said piston to said plunger, and inlet means for introducing air under pressure to one side or the other of said piston, said inlet means being in communication with inlet ports formed in said cylinder at opposite sides of said piston and including a plate encircling said cylinder and formed with elongated air passageways in communication with said inlet ports, and circumferentially sealing means on said cylinder and contacting said plate providing substantially airtight seals between said cylinder and said plate to effectively isolate said inlet ports and their respective communicating passageways.

3. In an injection molding machine, a mold including a cavity block having a molding surface, means providing a bore having a valve seat in communication with said molding surface, a valve plunger mounted in said bore for reciprocating movement toward and away from said valve seat, a backup plate spaced from said cavity block, and means within said mold intermediate said cavity block and said backup plate for effecting reciprocatory movement of said valve plunger, said means including a cylinder mounted between said cavity block and said backup plate in axial alignment with said bore, a double-acting piston mounted in said cylinder for reciprocation, a piston rod in axial alignment with said valve plunger and operatively connecting said piston to said valve plunger, and inlet means for introducing air under pressure to one side or the other of said piston, said inlet means being in communication with inlet ports formed in said cylinder at opposite sides of said piston and including a plate encircling said cylinder and formed with elongated air passageways in communication with said inlet ports, and circumferentially sealing means on said cylinder and contacting said plate providing substantially airtight seals between said cylinder and said plate to effectively isolate said inlet ports and their respective communicating passageways.

4. In an injection molding machine, a mold including a cavity block having a molding surface, means providing a bore in communication with said molding surface, a plunger mounted in said bore for reciprocating movement toward and away from said molding surface, a backup plate spaced from said cavity block, and means within said mold intermediate said cavity block and said backup plate for effecting reciprocatory movement of said plunger, said means including a cylinder mounted between said cavity block and said backup plate in axial alignment with said bore, a double-acting piston mounted in said cylinder for reciprocation, a piston rod in axial alignment with said plunger and operatively connecting said piston to said plunger, and inlet means for introducing air under pressure to one side or the other of said piston, said inlet means being in communication with inlet ports formed in said cylinder at opposite sides of said piston and including a plate encircling said cylinder and formed with elongated air passageways in communication with said inlet ports, and circumferentially sealing means on said cylinder and contacting said plate providing substantially airtight seals between said cylinder and said plate to effectively isolate said inlet ports and their respective communicating passageways.

5. In an injection molding machine, a mold including a cavity block having a molding surface, means providing a bore in communication with said molding surface, a plunger mounted in said bore for reciprocating movement toward and away from said molding surface, a backup plate spaced from said cavity block, and means within said mold intermediate said cavity block and said backup plate for effecting reciprocatory movement of said plunger, said means including a cylinder mounted between said cavity block and said backup plate in axial alignment with said bore, a double-acting piston mounted in said cylinder for reciprocation, a piston rod in axial alignment with said plunger and operatively connecting said piston to said plunger, and inlet means for introducing air under pressure to one side or the other of said piston, said inlet means being in communication with inlet ports formed in said cylinder at opposite sides of said piston and including a plate encircling said cylinder and formed with elongated air passageways in communication with said inlet ports, and circumferentially sealing means on said cylinder and contacting said plate providing substantially airtight seals between said cylinder and said plate to effectively isolate said inlet ports and their respective communicating passageways, said cylinder having a pair of spaced end walls, spacing means on said end walls extending into said cylinder and engageable with said piston to limit movement of said piston to enable air to be supplied through said inlet ports on each side of said piston.

References Cited in the file of this patent
UNITED STATES PATENTS

| | | |
|---|---|---|
| 2,372,177 | Conner | Mar. 27, 1945 |
| 2,770,011 | Kelly | Nov. 13, 1956 |
| 2,773,284 | Kelly | Dec. 11, 1956 |
| 2,828,507 | Strauss | Apr. 1, 1958 |
| 2,912,719 | Gilmore et al. | Nov. 17, 1959 |

OTHER REFERENCES

Modern Plastics, March 1942, page 68.